Oct. 17, 1933.                J. F. HABIG                1,931,349
                              GRASS EDGER
                           Filed Feb. 16, 1932

John Francis Habig
INVENTOR
BY Victor J. Evans & Co.
ATTORNEYS

Patented Oct. 17, 1933

1,931,349

UNITED STATES PATENT OFFICE 1,931,349

GRASS EDGER

John Francis Habig, Cumberland, Md.

Application February 16, 1932. Serial No. 593,298

1 Claim. (Cl. 97—227)

This invention relates to improvements in grass edgers, and has for its primary object the provision of an improved blade construction, adaptable for use as a grass edger, sod cutter, turf edger and remover.

One of the foremost objects of the invention is to provide a cutting implement for removing turf or grass and roots from that portion of a lawn at the sides of a concrete or other sidewalk.

Another object of the invention is to provide a cutting implement for trimming that portion of the turf of the lawn, along the edge of flower beds, the design of the blade of the edger being such, that it can be conveniently used to spade the edge of a flower bed after each stroke used in cutting the turf, and in doing so the turf thus cut, can be spaded in or under the soil of the flower bed, so as to act as a fertilizer.

Another important object of the invention is to provide a cutting implement for removing the long projecting grass along the edge of a concrete or other sidewalk, which a lawn mower fails to reach.

Another important object of the invention is to provide an improved grass edger, having a foot rest formed at or fastened to the top of the blade.

Another important object of the invention is to provide a cutting implement for the purposes described, in which the blade is fastened to the handle or staff, by the means of a fork or bow, which permits of foot pressure on the top of the blade.

A further object of the invention is to accomplish the above results by a device that is simple in construction, durable and highly efficient for the purposes for which it is intended, requiring no adjustments and enabling the operator to remove grass or turf any distance from the sidewalk as may be desired.

Another object of the invention is to provide a cutting implement that is inexpensive to manufacture, therefore, could be placed on the market within reach of the average family.

Another object of the invention is to provide a cutting implement that is well balanced and light in weight, making it very convenient and easy to use for the different purposes stated above and requiring very little storage space.

With these and other objects as may hereinafter appear, the invention consists of the novel construction, combination and arrangement of parts to be hereinafter specifically described and then claimed.

Reference will now be had to the drawing forming a part of this specification, wherein there is illustrated a preferred embodiment of the invention, but it is to be understood that the structural elements thereof can be varied or changed without departing from the scope of the appended claim.

In the drawing:—

Figure 1:
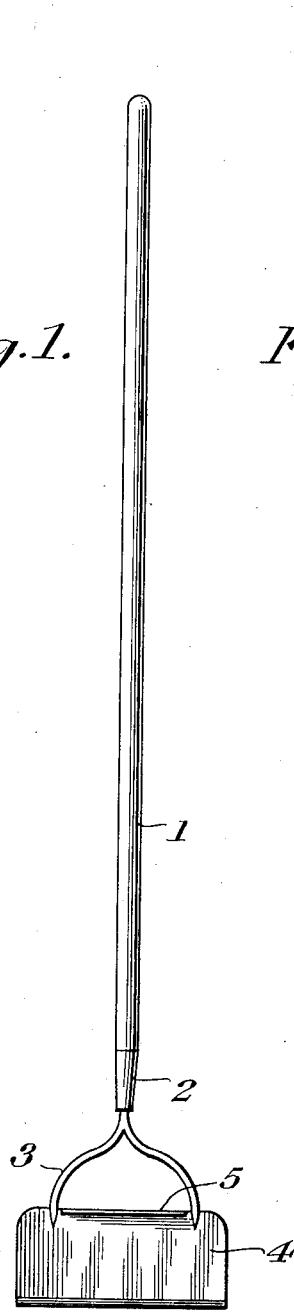
Figure 1 is a front view of the improved grass edger, constructed in accordance with my invention.
Figure 2:
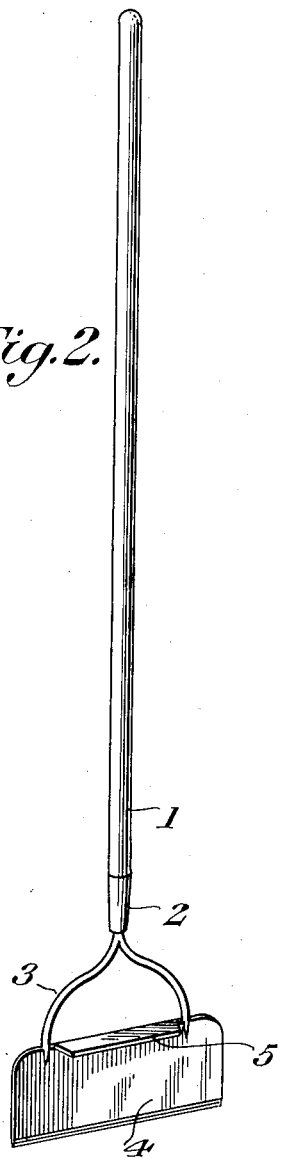
Figure 2 is a perspective view thereof, more fully showing the foot rest.
Figure 3:
Figure 3 is a side view, showing the angle of the foot rest in relation to the blade.

In carrying out my invention, in the form as shown in the drawing, I provide a staff or handle 1 which is driller or bored centrally and longitudinally at its lower end to fixedly receive the joined or shanked end of a fork or bow 3, and secured to the lower end of the handle in any manner, is a metal ferrule 2 for reinforcing the handle and to prevent splitting thereof, as will be apparent. Other methods of fastening the handle 1 to the fork may be employed, as for example the fork may be secured directly to a handle receiving socket member, by any suitable fastening means, or the socket receiving handle and fork may be integral and formed from a single piece of metal.

The blade of my tool is indicated by the reference numeral 4 and is shown as having rounded upper corners and a beveled cutting edge. The lower or remote ends of the tines of the fork 3 are preferably secured to the blade 4 by welding, but other fastening means may be employed for that purpose, such as for example by riveting, forging or the like, and in fact, the blade 4, the fork 3 and the ferrule 2 may be all formed together from a single piece of metal.

Formed on or otherwise secured to the upper longitudinal edge of the blade 4 and disposed between the tines of the fork 3 is a foot rest 5 which is preferably rectangular in formation and is shown as being arranged substantially at right angles with respect to the blade and from one side thereof. However, the foot rest can be disposed at any desired angle, and extend upon opposite sides of the blade as will be apparent.

The cutting blade and the foot rest are preferably made from steel, but other metals or combination of metals may be employed.

From the above description and disclosure of the drawing, it will be obvious that I have provided a tool that is extremely simple in construction, but is capable of being used to perform its intended functions in an easy, expeditious and efficient manner, and while the edging operation will probably be apparent, a brief explanation thereof is as follows:

In edging turf along a concrete or other walk, with my tool, it is ordinarily only necessary to place the tool against the edge of the walk and exert a downward pressure on the handle while holding the same in a vertical position, but in cases where the grass and roots are extremely thick, it is usually necessary to make use of the foot rest. To remove turf from the edge of a walk the blade is placed on the grass, at any desired distance from the walk with the handle held at an angle of 45 to 60 degrees with respect to the ground, and forward pressure is then applied to the handle for forcing the blade through the turf, until the cutting edge of the blade reaches the side of the walk below the surface, then with a downward pressure on the handle, the turf is raised, and thence placed upon the sidewalk by lifting the turf on the blade.

It is thought from the foregoing description that the advantages and novel features of my invention will be readily apparent.

I desire it to be understood that I may make changes in the construction and in the combination and arrangement of the several parts, provided that such changes fall within the scope of the appended claim.

I claim:

A lawn edger comprising a straight elongated substantially rectangular relatively narrow thin flat blade, a fork consisting of tines having spaced lower ends secured to the upper longitudinal edge of the blade between its ends and being curved upwardly therefrom with their upper ends joined together, a foot rest formed on the upper edge of the blade between the points of connection of the tines therewith and extending at right angles therefrom, a handle receiving the upper ends of the tines with the latter secured therein, and reinforcing means for the handle at the joint of the latter and the tines.

JOHN FRANCIS HABIG.